(12) United States Patent
Vaccaro et al.

(10) Patent No.: US 6,765,532 B2
(45) Date of Patent: Jul. 20, 2004

(54) WIDEBAND SIGNAL DETECTION AND TRACKING SYSTEM

(75) Inventors: Thomas R. Vaccaro, Hudson, NH (US); Norman D. Paul, Brookline, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/320,965

(22) Filed: Dec. 17, 2002

(65) Prior Publication Data

US 2004/0113839 A1 Jun. 17, 2004

(51) Int. Cl.[7] .................................................. G01S 5/02
(52) U.S. Cl. ...................... 342/417; 342/195; 342/421; 342/445
(58) Field of Search ................................ 342/195, 417, 342/421, 445

(56) References Cited

U.S. PATENT DOCUMENTS

| | | | | |
|---|---|---|---|---|
| 4,641,143 A | * | 2/1987 | Apostolos | 342/445 |
| 4,654,667 A | * | 3/1987 | Apostolos et al. | 342/445 |
| 5,990,834 A | * | 11/1999 | Barrick et al. | 342/418 |

OTHER PUBLICATIONS

Ellingson et al, A subspace–Tracking Approach to Interference Nulling for Phased Array–Based Radio Telescopes, Jan. 2002, IEEE Transactions on Antennas and Proppagation, vol. 50, No. 1, p. 25–30.*

Kavcic et al, A new Effecient Subspace Tracking Algorithm Based on Singular Value Decomposition, IEEE 1994, 0–7803–1775 0/94, p. IV–485—IV488.*

Chen et al, Multi–Target Angle Tracking Via Antenna Array, IEEE 1995, 0–7803–2719–5/95, p. 459–462.*

Brian G. Agee of AGI Engineering Consulting, Fast Acquisition of Burst and Transient Signals Using a Predictive Adaptive Beamformer, 1989 IEEE Military Communications Conf.

Ralph O. Schmidt, Multiple Emitter Location and Signal Parameter Estimator, IEEE Proceedings of the RADC Spectrum Estimation Workshop, Oct., 1979.

(List continued on next page.)

*Primary Examiner*—Stephen C. Buczinski
(74) *Attorney, Agent, or Firm*—Daniel J. Long

(57) ABSTRACT

A system is provided for assisting in the detection and tracking of narrowband signals arriving at an antenna array operating over a wide detection bandwidth and in a crowded RF environment. Since the nature of the detection mission is constrained to be a general search, the system does not attempt to detect signals of interest via matched filtering mechanisms (i.e. training sets), but exploits general properties such as power, frequency, time and angle of arrival. For the purposes of providing sufficient Frequency/Time resolution as well as to avoid array overloading in the detection process, the digitized wideband streaming data is frequency channelized using a sufficiently high revisit rate for the signal set of interest, constrained by the required feature detection accuracy or environment adaption rates. Within each frequency subchannel, efficient array signal subspace tracking techniques are used to separate and track spatially separated cochannel signals. Subspace tracking allows the efficient update of the signal subspace, useful for direction finding and copy applications, as well as determining the number of signals present in a frequency channel. Since the frequency channelization of the detection system may not match that of the detected signal, the combination of Time/Frequency/Space information is used to cluster or group frequency subchannels and provide a higher degree of signal detection capability with an increased robustness against false signal detections.

21 Claims, 3 Drawing Sheets

OTHER PUBLICATIONS

Aleksander KAV–I–and Bing Yang, Adaptive Rank Estimator for Spherical Subspace Trackers, IEEE Transactions on Signal Processing, vol. 44, No. 6, Jun. 1996.

Bing Yang, An Extension of the PASTd Algorithm to Both Rank and Subspace Tracking, IEEE Signal Processing Letters, vol. 2, No. 9, Sep. 1995.

Edward C. Read, Donald W. Tufts and James W. Cooley, Two Algorithms For Fast Approximate Subspace Tracking, IEEE Transactions on Signal Processing, vol. 47, No. 7, Jul. 1999.

* cited by examiner

WIDEBAND SIGNAL DETECTION AND TRACKING SYSTEM

FIELD OF INVENTION

This invention relates to the detection of signals in interference and more particularly to an improved spatial acquisition system utilizing signal subspace tracking.

BACKGROUND OF THE INVENTION

The purpose of a spatial acquisition process is to detect signals in a cluttered RF environment. The ability to ascertain when a new signal birth occurs is extremely important in modern warfare to quickly identify the signal type and the location of its transmitter. Finding signals and identifying them is particularly troublesome when listening in on a wide range of frequencies, so called wideband signal acquisition.

In addition to the problem of discerning a signal from background environment noise, one is faced with the problem of detecting signals occupying the same frequency band, so called co-channel interferers. Single antenna (non-spatial) detection systems attempt to detect new signal energy through changes in amplitude in narrowband frequency channels (i.e. a channelizing receiver). Attempts to detect co-channel signals require that the new signal power exceeds the existing signal level by a significant amount (Signal on Signal detection) in order to trigger a new signal detection. Obviously, this requirement for increased signal power only works in a limited number of situations, and often the signal of interest will be received in a channel at lower power than an existing interferer, making it difficult if not impossible to detect.

It will be shown that by using an array of antennas and processing in a spatial manner, one is able to discern the existence of multiple signals using detection via rank mechanisms and angle of arrival. This adds an additional dimension other than amplitude and allows one to separate the signals in a manner that one cannot do by using a single antenna. As an example, many military radios happen to also occupy the same frequency band as TV stations. If one uses an aircraft for surveillance and one uses a single channel acquisition system, ie one with a single antenna, one is going to detect or see the TV station because it is the stronger of the two signals. In a battlefield scenario the military signal might be hidden amongst the frequency content of the TV station. On the ground military personnel can talk back and forth because they do not receive the signals from the TV station, but in the air one might detect signals from both of these sources. It is therefore important to be able to spatially separate the military signals from the TV signals so as to identify where the signals came from.

Prior Approaches

A prior approach devised by Brian G. Agee of AGI Engineering Consulting, provided beamforming on new signal births or signals which have burst characteristics, off/on. The beamformer 'weights' are calculated by looking at the so-called 'change matrix' or the new covariance matrix versus the old covariance matrix and generates the beamformer weights which maximize the Signal to Interference ratio for the 'new' signal. Therefore, a wide bandwidth detection system based on this approach, and assuming frequency channelization, would require application of this technique on all frequency channels all the time and looking at the output of the beam former to determine whether new energy had arrived at the array. If the amount of output power from the beamformer exceeded a threshold, Agee's process would declare that occurrence a new detection.

A weakness of the Agee process is that the focus is strictly on new energy detection. It considered the old signal environment to be background interference, and simply looked for changes to the background. The Agee process only allowed for a change of one signal or a rank change of one to this background. This prevents for instance deciding that there are two or more new incoming signals. Unfortunately with that approach there was never an understanding of what the background environment was. For instance, signals that were always up would be ignored because they were considered part of the background environment. In other words the Agee process was optimal for new energy alarms or for bursty signals, ie. signals that go off to on and vice versa. However, the Agee process had little benefit for tracking existing signals and was limited to leading edge clustering, only. As a result, to build a more robust reconnaissance system, one needs to not only be interested in signals that are bursty or new but also to be cognizant of the signals that are already in the environment. In order to know the number of signals present, both old and new, one required a separate processing path to look for the signals that were stable, e.g. the ones that were not bursty in nature.

In short, assuming that multiple signals arrived at an antenna array, in the past there was no particularly good way of ascertaining how many steady state signals were there as opposed to bursty signals. What this means is that if for instance there were four signals that were constantly on and two more signals arrived, the Agee process would associate the four signals with the background environment, i.e., noise, and associate the two new signals as a combined signal in the signal subspace.

Determining the Number of Signals Impinging on the Array

Therefore, one of the key requirements for the detection of a signal in a dense RF environment is to determnine the total number of signals that are impinging on the array. Existing block processing techniques focus on eigen-space decomposition of the data covariance matrix, then, applying rank estimation techniques such as Minimum Data Length, MDL or Akaike Information Criteria, AIC to separate the signal and noise subspace components. The rank of the signal subspace is equivalent to the number of spatially separated signals impinging on the array. Standard algorithms for performing eigen decomposition include the symmetric QR algorithm and Jacobi rotations. A limiting assumption of these signal subspace decomposition techniques is that the total number of signals impinging on the array is less than the number of array elements or degrees of freedom, DOF. These block processing approaches to signal subspace decomposition have been developed for tasked DF systems, that is to capture a buffer full of data and then post-process the buffered data to determine how many signals are in the buffer. Thereafter one can employ a superresolution DF algorithm, such as the MUSIC algorithm, to determine angle of arrival information.

Articles relating to Superresolution DF and subspace tracking are as follows: Multiple Emitter Location and Signal Parameter Estimator by Ralph O. Schmidt, IEEE Proceedings of the RADC Spectrum Estimation Workshop, October 1979; Adaptive Rank Estimator for Spherical Subspace Trackers by Aleksander Kaveie and Bing Yang, IEEE Transactions on Signal Processing, Vol. 44, No. 6, June 1996; An Extension of the PASTd Algorithm to Both Rank and Subspace Tracking, Bin Yang, IEEE Signal Processing Letters, Vol. 2, No. 9, September 1995; and, Two Algorithms For Fast Approximate Subspace Tracking by Edward C. Read, Donald W. Tufts and James W. Cooley, IEEE Transactions on Signal Processing, Vol. 47, No. 7, July 1999.

Extension to Wide Band Signal Acquisition

For wide bandwidth signal detection across a multiple antenna array, spatial acquisition requires N antennas [e.g., N=8 antennas]. Theoretically, the largest rank or number of signals that can be found with 8 antennas is 7 signals, the other one being the noise signal. With 8 antennas there are eight degrees of freedom. In a wideband system all degrees of freedom can easily be occupied. This is because in a wideband application for instance having a bandwidth of 80 MHz the likelihood that there will be more than 7 signals is virtually guaranteed. What one needs to do is to break up the large band into smaller channelized frequency bands such that the likely number of signals in each of those smaller frequency bands is much less than the full eight, preferably four or less for most practical arrays. The narrower a bin, the smaller the likely number of potential interferers that will exist in the frequency bin.

However, with very narrow frequency bins, it is likely that signals can straddle many different bins. One therefore needs to do signal subspace determination on each one of those bins, independently, and make decisions at a later date using a technique called "clustering" to determine whether signals from adjacent frequency bins should be grouped as a single signal.

In short, when surveilling a wide frequency range such as between 20 MHz and 100 MHz, assuming an 8 element array, for the 80 MHz band the likelihood of there being 4–8 interfering signals is very high. In order to assure there being no more than 4 signals in a band, the original 80 MHz band is sub-channeled into 25 KHz bins. The subdivision however reinforces the need for some ability to be able to separate out overlapping signals or signals which overlap multiple bins and overlap each other.

This, in addition to frequency selectivity, drives the wide band acquisition system towards frequency channelization.

Signal Subspace Tracking

If one extends these block processing techniques to the streaming wideband spatial acquisition problem, one is faced with multiple channelized frequency bins each requiring independent processing. These block eigenanalysis techniques are typically very time consuming and would be prohibitive for the wideband spatial acquisition problem. One needs to employ more efficient update approaches to meet the throughput requirements of multiple bins of streaming data. More efficient subspace tracking techniques such as those developed by Bin Yang and Edward Real assume streaming data across multiple antennas and attempt to determine the signal subspaces recursively, by updating previous signal subspace estimates. This reduces computational complexity and is a much more efficient process than block processing. The efficiencies afforded by Yang and Reals for a single frequency channel permit wideband signal acquisition by applying these techniques to multiple independent frequency bins.

As previously discussed, wideband signal acquisition requires the break up of the wide band into smaller channelized frequency bands or bins and by so doing limiting the number of signals in any frequency bin. This is done by making the frequency bins narrow enough so that it is unlikely that the number of signals will occupying a given frequency bin exceeds the number of antennas. However, channelizing the entire wide bandwidth into subchannels compounds the problem, because one now has to do the spatial or subspace tracking over large numbers of frequency bins. One therefore needs to focus on an efficient implementation of a subspace tracker because one needs to do it across many frequency-channelized bins. Bin Yang and Edward Real, while achieving great efficiencies in subspace tracking in a single frequency channel, did not identify how to extend to multi-bin wideband applications.

SUMMARY OF THE INVENTION

In order to provide a system for the detection and tracking of narrowband signals arriving at an antenna array operating over a large bandwidth in a crowded RF environment, in the subject invention the large bandwidth is subdivided into subchannels or narrow frequency bins and real time subchannel spatial tracking is done across all bins to arrive at the number of signals and associated eigen vectors in these bins. The result is that the number of signals from the subspace tracking is available to a new signal detector to detect a change in the number of signals present, whether or not the signals have persisted over a long period of time. This detector provides a bin-up alarm to a clustering algorithm operating on all bins. The clustering is done not only on a time/frequency basis but also using angle of arrival from a direction finding algorithm, because, the output from subspace tracking, ie number of signals and associated signal subspace eigenvectors, can be used by a multiple signal AOA algorithm and beamformer.

Cluster analysis ascertains with some certainty that signals which overlap adjacent bins are in fact the same signal. Having ascertained what bins have a specific signal, the energy from only those bins is read out through a multi-bin combiner. The recombined signal, after beamforming, is passed as a "signal"-up alarm to a signal analysis unit for analyzing the multi-bin combined "signal".

Since very few analyzers are usually provided, it is important that only validated signals be analyzed. Validation is accomplished through subspace tracking on multiple subchannels, coupled with AOA processing using the output from the subspace tracker, time/frequency clustering techniques and beamforming. With this type of validation either fewer signal analyzers need to be provided or those provided can be used more efficiently.

What is therefore provided is an efficient subspace tracker applied to the spatial acquisition problem. This means that the number of signals is determined for all bins vs. time. Knowledge of rank vs. time on a bin-by-bin basis provides a new detection criteria to determine when the number of new signals exceeds the number of old signals. Note that the number of new signals can be greater than one, unlike what can be detected by the Agee process.

It is an important feature of the subject system that the elements of the system can be partitioned so that new subspace tracking algorithms can be substituted for old ones without affecting any of the other processes.

Moreover, if one wants even wider bandwidths, one can simply add more subchannels or frequency bins, making the system scalable.

The problem of processing a large number of subchannels is solved by utilizing efficient subspace trackers and multi-bin clustering, which includes the use of direction finding information. The signal subspace tracker provides the required input to the direction finding algorithm, and thus solves the problem in the past of gaining angle of arrival data from another subsystem.

Allowing for instantaneous rank changes of greater than one supports the detection of multipath in which the same original signal arrives from multiple directions.

In summary, a system is provided for assisting in the detection and tracking of narrowband signals arriving at an antenna array operating over a wide detection bandwidth and in a crowded RF environment. Since the nature of the detection mission is constrained to be a general search, the system does not attempt to detect signals of interest via matched filtering mechanisms (i.e. training sets), but exploits general properties such as power, frequency, time and angle of arrival. For the purposes of providing sufficient Frequency/Time resolution as well as to avoid array overloading in the detection process, the digitized wideband streaming data is frequency channelized using a sufficiently high revisit rate for the signal set of interest, constrained by the required feature detection accuracy or environment adaption rates. Within each frequency subchannel, efficient array signal subspace tracking techniques are used to separate and track spatially separated cochannel signals. Subspace tracking allows the efficient update of the signal subspace, useful for direction finding and copy applications, as well as determining the number of signals present in a frequency channel. Since the frequency channelization of the detection system may not match that of the detected signal, the combination of Time/Frequency/Space information is used to cluster or group frequency subchannels and provide a higher degree of signal detection capability with an increased robustness against false signal detections.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
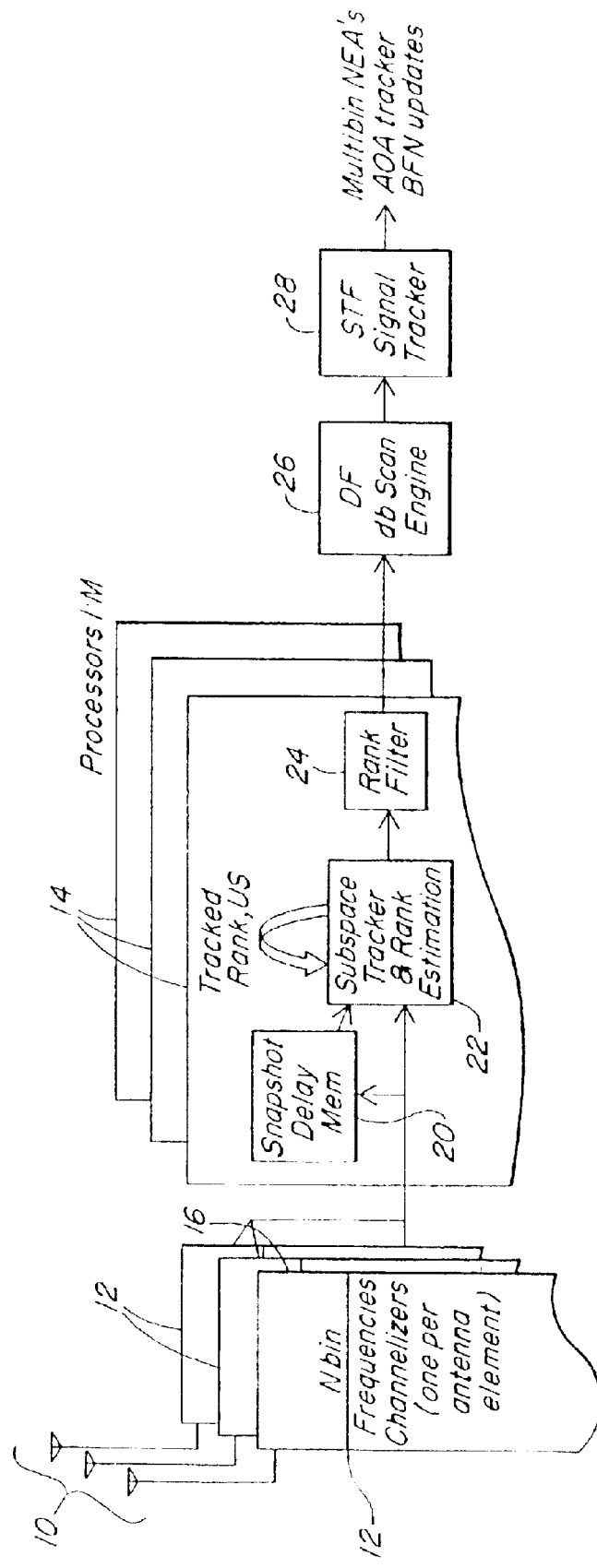
FIG. 1 is a block diagram of the subject spatial subspace detection architecture.

Referring now to FIG. 1, the architecture of a spatial subspace detector is illustrated in which incoming signals are detected by an array 10 of antennas, with each antenna defining a wideband spatial channel. The output of each the antennas is coupled to a frequency channelizer 12 which divides the bandwidth into a number of frequency subchannels, in one embodiment 25 KHz wide. These are referred to as frequency bins.

Having channelized the band one divides up the bins into groups of bins by antenna to be processed, with the number of processors determined by the processing power of the processors involved. Given M processors and K bins of multi-antenna snapshots, then a standard configuration would he to distribute the workload such that each processor processes K/M bins. It will be appreciated that a snap shot is a synchronized measurement across all antennas for a given bin. As illustrated, a number of processors 14 are provided, with each processor dedicated to processing a predetermined bin across the N antennas. As shown by line 16, a single bin for each of the antennas is coupled to a single processor. However, depending on the processing power, it is possible to have a single processor process multiple bins. For instance, if ten bins are to be processed, then the processor processes all ten bins for all of the antennas.

The purpose of each of the processors 14 is to function as a subspace tracker, with a buffer or snapshot delay memory 20 interposed between the channelizer and a subspace tracker and rank estimation unit 22. This unit provides as an output signal subspace estimates which consist of rank, eigenvalues and associated eigenvectors. The output of the subspace tracker and rank estimation unit 22 is coupled to a rank filter 24 which smoothes the output to reduce the effects of impulsive noise. Thus, the output of rank filter 24 is a filtered version of the output of subspace tracker and rank estimation unit 22.

The output of rank filter 24 is applied to a DF db [calibration or steering vector data base] scan engine 26 which functions as an angle of arrival calculator, the output of which is coupled to a clustering engine downstream.

It will be appreciated that the output of rank filter 24 functions as a "new signal" detector which detects the presence of a new signal and gives a "bin up" alarm as will be described hereinafter.

Note that with respect to the output of the rank filter, a new signal will be indicated if the rank changes. However, there are situations in which there is no instantaneous rank change, but rather the signal has existed over a long period of time. In such a case there is no abrupt change in rank for the "new signal" detector to detect. However, because there is knowledge of rank over time, the "new signal" detector may request angle of arrival updates from DF db scan engine 26 to maintain track for the signal.

As will be described hereinafter, DF db scan engine 26 measures angle of arrival through the utilization of a DF algorithm such as MUSIC which is a super-resolution DF algorithm. The input to the DF db scan engine 26 is the rank and associated signal eigenvectors and the output is the angles of arrival which are then coupled to a spatial, time, frequency [STF] signal tracker or clustering engine which identifies that signals are the same based on frequency, time and spatial considerations.

The output of the STF signal tracker constitutes a multi-bin "new energy" alarm which no longer has the boundaries of a single bin. Rather, the clustering across multiple bins associates or groups of bins and can be used to provide the multi-bin "signal up" alarm. Moreover, if a "signal up" event has been determined to occur by the clustering, one then provides the corresponding signal for AOA tracking and beam former updates. Note that the subspace and angle of arrival information is utilized in downstream beam forming.

The individual results from each of the bins are available from the STF signal tracker. This means that for each of the individual bins one has the eigen vectors and the rank. Moreover, the clustering provides the knowledge that specific bins go together as indicating a single signal. One of the results of knowing the above is that one can then do beam forming in the traditional sense. In addition, one can do is reconstruct the individual bins into a composite signal for further analysis.

In operation, one starts the process out by channelizing the overall band into multiple bins for each antenna output.

One then goes through a subspace tracking process to determine the rank in each of the bins using a spatial process, which means processing across all antennas. At the end of the processing one then reassociates bins having a single signal through clustering. This determines which individual bins have energy relating to a single signal. Reassociating these bins permits reconstruction of a signal without any co-channel interference. In short, unlike prior clustering systems, the subject clustering is accomplishable through spatial, time and frequency clustering techniques that determines which bins go together in which for the first time spatial information is available and used.

Figure 2:
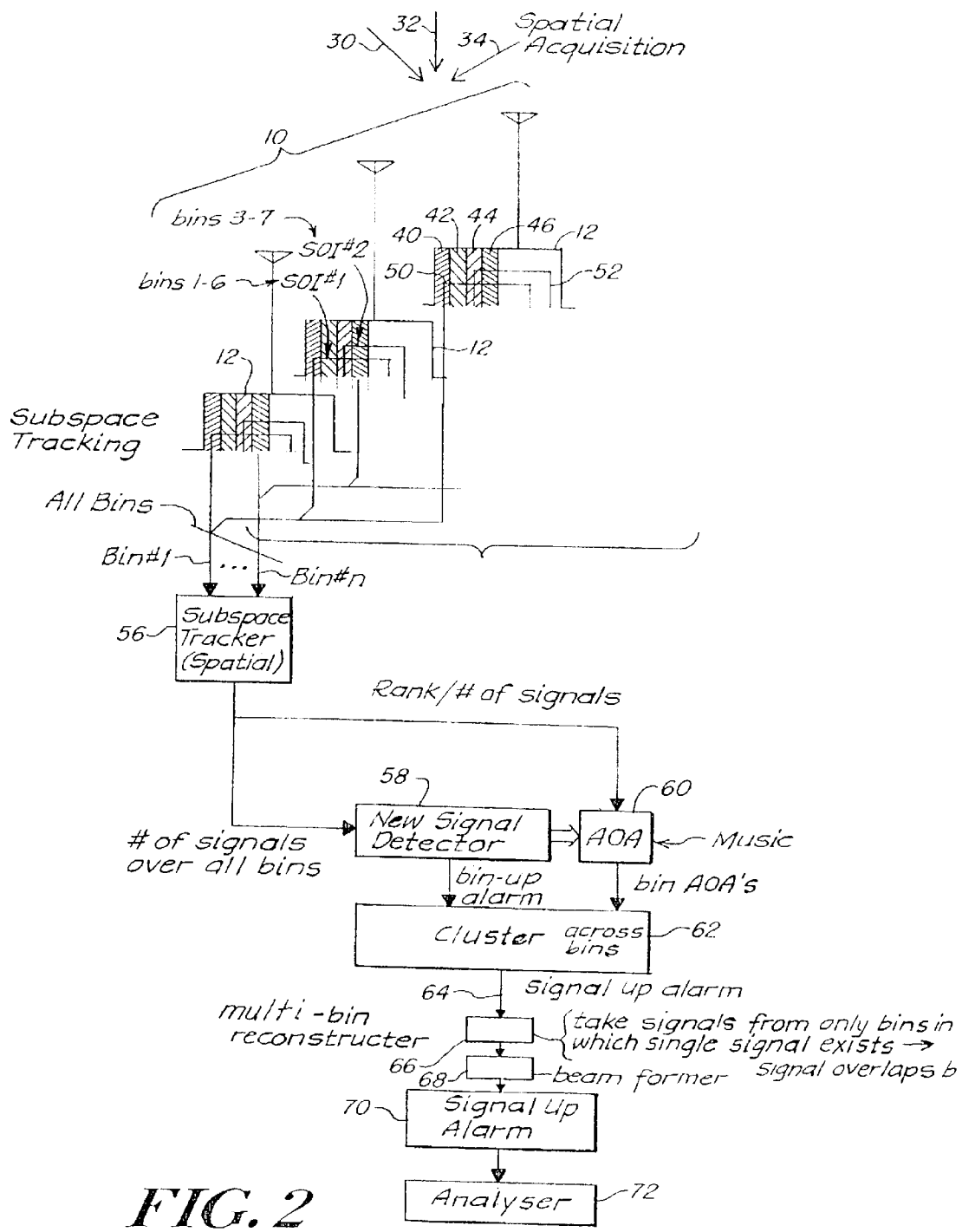
FIG. 2 is a diagrammatic illustration of the use of subspace tracking with an array of antennas for use in new signal detection involving the use of clustering, bin reconstruction and beam forming to detect the presence of new signals in a crowded environment; and, FIG. 3 is a block diagram of the multi-bin reconstructor and beam former of FIG. 2 for providing a single output beam formed to maximize the signal-to-interference ratio.

Referring now to FIG. 2, alternatively one can characterize the subject process as involving the same antennas as in FIG. 1. Arriving at these antennas are multiple signals from different directions, but overlapping in frequency, as illustrated at 30, 32 and 34. The outputs of the antennas are frequency channelized as illustrated at 12, with each of the bins indicated by different shading as illustrated at 40, 42, 44 and 46. Thus, for each of the antennas one subdivides the band into subchannels or bins 40–46. When having overlapping signals in frequency, spatial acquisition can be utilized in determining the angle of arrival of the individual signals.

For illustrative purposes it will be appreciated that one can have a first signal of interest as illustrated at 50 which goes across bins 40, 42, 44 and 46 but is of lower amplitude than a second signal of interest, here illustrated at 52, which straddles bins 42, 44 and 46. With single antenna approaches it would be impossible to detect the existence of the lower power signal in the presence of the higher power signal. However, with subspace tracking one can determine which bins have the same signal. Thus the arrival of a new signal can be robustly ascertained.

In order to do this one couples the outputs of the various bins across antennas to a spatial subspace tracker 56. This provides the rank of the signal in each bin that is coupled to a "new signal" detector 58 for detecting the presence of the arrival of or the removal of a signal as detected by rank.

Subspace trackers are well known and can include techniques which have been developed by Yang and Real. Regardless of whose subspace tracker is utilized, the result is an output which yields rank, eigenvalues and eigenvectors related to the signal subspace for signals in each bin.

As can be seen from the above description, the subspace tracker can detect signals in the presence of higher input power cochannel signals. Moreover, utilizing subspace tracking one can track multiple signals, in order to maintain knowledge of the background signal environment over time. The purpose of signal detector 58 is to detect a change in rank and to output a "bin up" alarm when a rank change has occurred. It also provides the control logic to task or activate the angle of arrival unit 60 which corresponds to DF db scan engine 26 of FIG. 1.

When detector 58 detects a new signal, one tasks angle of arrival unit 60 immediately. However, in the alternative case when a new signal has not recently arrived but has been present for several minutes for instance, the logic in "new signal" detector 58 also asks for an update of angle of arrival and does so on a periodic basis. Thus, the angle of arrival detector is tasked either when there is a new signal which has appeared or disappeared, or periodically when new signals have existed for some predetermined period of time.

Angle of arrival detector 60 which may include the aforementioned MUSIC algorithm, requires knowledge of rank or the number of signals and the associated eigenvectors from subspace tracker 56. This number-of-signals input to angle of arrival detector 60 is either periodically updated or updated in the presence of a rank change and provides that the angle of arrival detector be a real time device. It is available continuously to provide angle of arrival information, thus bypassing the need for offline batch AOA processing.

As illustrated, the output of the "new signal" detector 58 and the angle of arrival detector 60 are coupled to a clustering engine 62 which determines across all of the bins which signals in the bins belong together. In the past this has been done through a time, frequency technique. However, in the subject invention a further parameter, namely a spatial parameter, is added to be able to more robustly cluster bins. Knowing that for given set of bins not only does the signal come in at the same time and spans these bins, knowing that all of the signals in these bins come in at the same angle indicates that the signal spanning these bins is in fact the same signal. Were they to come in from different angles, then one could determine that the signals in these bins are in fact different signals.

Once having determined that a single signal is occurring in a number of bins, a "signal up" alarm is applied over line 64 in one embodiment to a bin reconstructor or recombiner 66 which takes signals from only bins in which a single signal is determined to exist. This permits downstream analysis of the signal for other purposes.

Additionally, the output of a bin reconstructor 66 for each antenna is applied to a beam former 68, the purpose of which is to isolate the signal from interference. The output of the beam former is therefore a composite signal whose beam-former weights have been adjusted to maximize the signal to interference ratio and which can be used as a "signal up" alarm as illustrated at 70 and more particularly can be passed to an analyzer 72 for further analysis.

Multi-bin construction is described in pending Provisional U.S. patent application Ser. No. 60/407,874, filed Aug. 29, 2002 by Thomas Vaccaro and Allan Kabel, assigned to the assignee hereof and incorporated herein by reference. Beam forming is conventional and normally involves spatial filtering through the application of weights for each channel.

Figure 3:
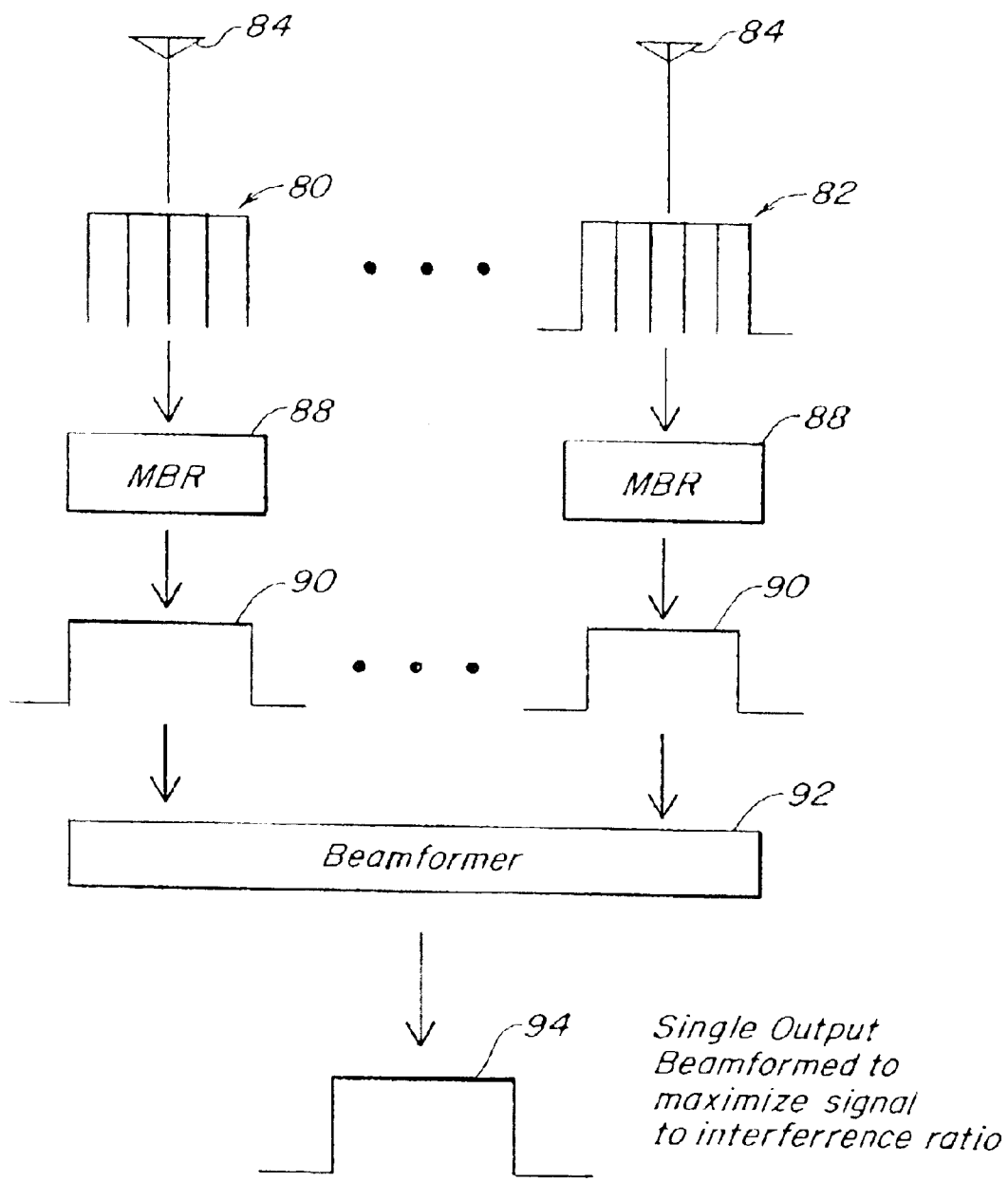

Referring now to FIG. 3, what is shown is multi-bin reconstruction which results in composite signals from multiple bins that are then passed through to a beam former, the output of which is a single output beam formed in the direction of the signal. Here it can be seen that a number of bins 80 and 82 associated with antennas 84 and 86 respectively are multi-bin reconstructed as illustrated at 88 so as to provide a composite signal corresponding to the energy in selected bins. This composite signal is illustrated at 90 and is coupled to a beam former 92 such that the output is a single output 94 which is beam formed in the direction of the signal. More importantly, the beam former in addition to providing beam forming in the direction of the signal is used to maximize the signal-to-interference ratio, thereby providing a nullifying function for interfering signals.

A program listing for the subject system is presented below on the attached Appendix "A".

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for avoiding array overload in a system used for detecting individual signals in the midst of co-channel interferers by detecting and tracking the arrival of a new narrowband signal in signals arriving at an antenna array over a wide detection bandwidth, comprising:

a digitizer for digitizing a wideband data stream from said array:

a frequency channelizer coupled to said digitizer for frequency channelizing said data stream into frequency bins corresponding to frequency subchannels, said channeling being done at a sufficiently high revisit rate for a signal of interest, said rate constrained by required feature detection accuracy or environmental adaptation rates;

a subspace tracker coupled to each frequency bin for performing subspace tracking within each frequency subchannel, thus to subspace track over all frequency bins;

a clustering engine for combining the outputs of frequency bins based on Time/Frequency and Space subspace tracking results of each of said bins so as to cluster frequency subchannels into those bins having a specific identified signal; and, a downstream analyzer for processing only those frequency bins having said specific identified signal, thus to minimize downstream processing.

2. The system of claim 1, and further including an angle of arrival calculator coupled to said clustering engine for ascertaining for each of the signals in each of said bins the angle of arrival of signals in each bin, said spatial information for clustering coming from said angle of arrival detector.

3. The system of claim 2, wherein said angle of arrival calculator includes as an input the rank of signals in a bin.

4. The system of claim 2, and further including a bin recombiner coupled to said clustering engine for combining the outputs of only those bins associated with a single signal as determined by said clustering engine.

5. The system of claim 2, and further including a beam former coupled to said clustering engine for generating a set of beam steering weights for a single signal as determined by said clustering engine.

6. The system of claim 2, and further including a bin up alarm coupled to said subspace tracker for detecting when the rank therefrom changes and for tasking said angle of arrival detector for outputting angle of arrival calculator responsive thereto.

7. The system of claim 6, and further including means for periodically tasking said angle of arrival calculator, such that angle of arrival information is available on a periodic basis regardless of the detection of a rank change.

8. A system for ascertaining when a new signal exists at an antenna array in a crowded RF environment, comprising:

a subspace tracker coupled to said array; and, a new signal detector coupled to said subspace tracker utilizing power, frequency, time and angle of arrival of signals at said array and for indicating a change in the number of signals at said array.

9. The system of claim 8, and further including an angle of arrival calculator coupled to said array and said subspace tracker, said angle of arrival calculator utilizing the output of said subspace tracker for real time processing.

10. The system of claim 8, and further including a frequency channelizer for dividing up the band of operation of said system into frequency sub-channel bins, said subspace tracker operating on the signals in all of said bins to provide rank and eigen functions for the signals in each of said bins.

11. The system of claim 10, wherein a signal spans a number of bins, and wherein said new signal detector includes a clustering engine for grouping together bins having a single signal.

12. The system of claim 11, wherein said new signal detector includes a bin recombiner for combining the energy in grouped bins resulting from the existence of a single signal across said grouped bins.

13. The system of claim 11, wherein said new signal detector includes a beam former.

14. A system for assisting in the detection and tracking of narrowband signals arriving at an antenna array over a wide bandwidth channelized into subchannel bins in a crowded RF environment, comprising:

a subspace tracker coupled to said antenna array for determining rank and eigen functions for signals in each of the frequency bins associated with subspace tracking such that subspace tracking is made to occur over all bins;

an engine for clustering the bins on the basis of time, frequency and spatial information; an angle of arrival which includes as an input the rank of signals in a bin calculator coupled to said clustering engine for ascertaining for each of the signals in each of said bins the angle of arrival of signals in each bin, said spatial information for clustering coming from said angle of arrival of signals in each bin, said spatial information for clustering coming from said angle of arrival detector; and a bin recombiner coupled to said clustering engine for combining the outputs of only those bins associated with a single signal as determined by said clustering engine.

15. The system of claim 14, and further including a beam former coupled to said clustering engine for generating a set of beam steering weights for a single signal as determined by said clustering engine.

16. The system of claim 14, and further including a bin up alarm coupled to said subspace tracker for detecting when the rank therefrom changes and for tasking said angle of arrival detector for outputting angle of arrival calculator responsive thereto.

17. The system of claim 16, and further including means for periodically tasking said angle of arrival calculator, such that angle of arrival information is available on a periodic basis regardless of the detection of a rank change.

18. A system for ascertaining when a new signal exists at an antenna array in a crowded RF environment, comprising:

a subspace tracker coupled to said array, a new signal detector coupled to said subspace tracker utilizing power, frequency, time and angle of arrival of signals at said array and for indicating a change in the number of signals at said array;

an angle of arrival calculator coupled to said array and said subspace tracker, said angle of arrival calculator utilizing the output of said subspace tracker for real time processing; and a frequency channelizer for dividing up the band of operation of said system into frequency sub-channel bins, said subspace tracker operating on the signals in all of said bins to provide rank and eigen functions for the signals in each of said bins.

19. The system of claim 18, wherein a signal spans a number of bins, and wherein said new signal detector includes a clustering engine for grouping together bins having a single signal.

20. The system of claim 19, wherein said new signal detector includes a bin recombiner for combining the energy in grouped bins resulting from the existence of a single signal across said grouped bins.

21. The system of claim 19, wherein said new signal detector includes a beam former.

* * * * *